US009363276B2

(12) United States Patent
Appler et al.

(10) Patent No.: US 9,363,276 B2
(45) Date of Patent: Jun. 7, 2016

(54) METHOD AND SYSTEM FOR TESTING AND VALIDATION OF CRYPTOGRAPHIC ALGORITHMS

(71) Applicant: Corsec Security, Inc., Fairfax, VA (US)

(72) Inventors: Matthew Alan Appler, Fairfax, VA (US); John Robert Morris, Arlington, VA (US); Elizabeth Meyers Rabe, Springfield, VA (US); David Patrick Holmes, Alexandria, VA (US)

(73) Assignee: CORSEC SECURITY, INC., Fairfax, VA (US)

( * ) Notice: Subject to any disclaimer, the term of this patent is extended or adjusted under 35 U.S.C. 154(b) by 30 days.

(21) Appl. No.: 14/509,106

(22) Filed: Oct. 8, 2014

(65) Prior Publication Data

US 2016/0099952 A1 Apr. 7, 2016

(51) Int. Cl.
*H04L 29/06* (2006.01)
*G06F 21/62* (2013.01)

(52) U.S. Cl.
CPC ........ *H04L 63/1408* (2013.01); *G06F 21/6218* (2013.01); *H04L 63/0823* (2013.01); *H04L 63/0876* (2013.01)

(58) Field of Classification Search
CPC ............ H04L 63/1408; H04L 63/0823; H04L 63/0976; G06F 21/6218
USPC ........................................................ 713/156
See application file for complete search history.

(56) References Cited

U.S. PATENT DOCUMENTS

| 4,914,697 A * | 4/1990 | Dabbish ................. G06F 21/72 380/264 |
| 5,631,960 A * | 5/1997 | Likens .................. H04L 9/0637 380/2 |
| 6,965,673 B1 | 11/2005 | Boneh et al. |
| 7,853,010 B2 * | 12/2010 | Teglia ....................... G06F 7/72 380/1 |
| 2004/0223607 A1 | 11/2004 | Griffin et al. |
| 2009/0119503 A1 | 5/2009 | Isaakian et al. |
| 2010/0287386 A1* | 11/2010 | Feix ........................ H04L 9/002 713/193 |
| 2011/0055649 A1 | 3/2011 | Koushanfar et al. |

OTHER PUBLICATIONS

International Search Report and Written Opinion, mailed Jan. 21, 2016 in PCT/US2015/053689 (9 pages).
"Implementation Guidance for FIPS PUB 140-1 and the Cryptographic Module Validation Program", National Institute of Standards and Technology Communications Security Establishment, Jan. 10, 2002, pp. 5-22 (print date Jan. 11, 2016).

* cited by examiner

*Primary Examiner* — Michael S McNally
(74) *Attorney, Agent, or Firm* — Buchanan Ingersoll & Rooney PC (57) ABSTRACT

A method for testing cryptographic algorithms includes: receiving one or more request files, wherein each request files is associated with a cryptographic algorithm and includes a plurality of tests; formatting the plurality of tests in each of the request files based on algorithm formatting rules; transmitting the request files; receiving a plurality of test results for each of the transmitted request files, wherein each test result corresponds to a test included in the respective request file and is generated by execution of the corresponding test using the cryptographic algorithm associated with the respective request file; generating a response file for each of the request files, wherein the response files includes a plurality of test results that correspond to each test included in the corresponding request file; formatting the plurality of tests results in each of the generated response files based on result formatting rules; and transmitting the response files.

37 Claims, 6 Drawing Sheets

METHOD AND SYSTEM FOR TESTING AND VALIDATION OF CRYPTOGRAPHIC ALGORITHMS

FIELD

The present disclosure relates to the testing and validation of cryptographic algorithms, specifically the reformatting of validation tests and generated tests results for the providing of efficient, standardized, and flexible testing and validation of cryptographic algorithms.

BACKGROUND

As computer systems have become more widespread, there has been a concomitant driver for additional computer security. Private citizens and businesses alike must prevent malicious actors from reading their electronic mail, credit card, banking data, and personal medical records. Such protection relies upon encryption of data to provide privacy, and proper encryption depends upon the use of specialized cryptographic algorithms. These cryptographic algorithms are designed by mathematicians, specified by standards bodies, and implemented by programmers in a wide range of hardware and software computer systems. Unfortunately, the complexity of the cryptographic algorithms means that mistakes can easily be made that would render the encryption ineffective.

As a result, new cryptographic algorithms are constantly under development, and implementations of cryptographic algorithms must be carefully tested (or "validated" to ensure they are correct. For example, in the United States, Federal Information Processing Standards (FIPS) publications set forth standards for security and communication in computer systems used by government agencies and contractors, including definitions of cryptographic algorithms. The government also runs a Cryptographic Algorithm Validation Program to test implementations against these FIPS standards.

However, the formatting of the tests developed by an agency are necessarily complex, and the administration of these tests upon a computer systems very difficult. As a result, it may take a significant amount of time for the entity to modify or recreate their systems in a manner to be able to properly execute the tests. In addition, results from the tests may again be formatted suitable for the entity's computer systems, but not suitable for the agency for review and validation of the cryptographic algorithms and/or implementations.

Thus, there is a need for a technical solution to efficiently format, manipulate, and process tests for execution by entity computing systems that are having their algorithms and implementations tested and format the results generated thereby for validation by the standardization agency that negates the need for the entity or agency to heavily modify their systems, which would otherwise result in expenditure of both time and resources.

SUMMARY

The present disclosure provides a description of systems and methods for testing cryptographic algorithms.

A method for testing cryptographic algorithms includes: receiving, by a receiving device, one or more request files, wherein each request files is associated with one or more cryptographic algorithms and includes a plurality of tests; formatting, by a processing device, the included plurality of tests in each of the received one or more request files based on one or more algorithm formatting rules; transmitting, by a transmitting device, the one or more request files; receiving, by the receiving device, a plurality of test results for each of the transmitted one or more request files, wherein each test result corresponds to various tests or portions of tests included in the respective request file and is generated by execution of the corresponding test using the cryptographic algorithm associated with the respective request file; generating, by the processing device, a response file for each of the one or more request files, wherein the response files includes a plurality of test results that correspond to various tests or portions of tests included in the corresponding request file; formatting, by the processing device, the included plurality of tests results in each of the generated response files based on one or more result formatting rules; and transmitting, by the transmitting device, the response files.

A system for testing cryptographic algorithms includes a receiving device, a processing device, and a transmitting device. The receiving device is configured to receive one or more request files, wherein each request files is associated with one or more cryptographic algorithms and includes a plurality of tests. The processing device is configured to format the included plurality of tests in each of the received one or more request files based on one or more algorithm formatting rules. The transmitting device is configured to transmit the one or more request files. The receiving device is further configured to receive a plurality of test results for each of the transmitted one or more request files, wherein each test result corresponds to various tests or portions of tests included in the respective request file and is generated by execution of the corresponding test using the cryptographic algorithm associated with the respective request file. The processing device is further configured to: generate a response file for each of the one or more request files, wherein the response files includes a plurality of test results that correspond to various tests or portions of tests included in the corresponding request file; and format the included plurality of tests results in each of the generated response files based on one or more result formatting rules. The transmitting device is further configured to transmit the response files.

A non-transitory computer readable recording medium is configured to store a program causing a processing device of a computing device to execute a method for testing cryptographic algorithms, where the method includes: receiving, by a receiving device, one or more request files, wherein each request files is associated with one or more cryptographic algorithms and includes a plurality of tests; formatting, by the processing device, the included plurality of tests in each of the received one or more request files based on one or more algorithm formatting rules; transmitting, by a transmitting device, the one or more request files; receiving, by the receiving device, a plurality of test results for each of the transmitted one or more request files, wherein each test result corresponds to various tests or portions of tests included in the respective request file and is generated by execution of the corresponding test using the cryptographic algorithm associated with the respective request file; generating, by the processing device, a response file for each of the one or more request files, wherein the response files includes a plurality of test results that correspond to various tests or portions of tests included in the corresponding request file; formatting, by the processing device, the included plurality of tests results in each of the generated response files based on one or more result formatting rules; and transmitting, by the transmitting device, the response files.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

System for Testing Cryptographic Algorithms

Figure 1:
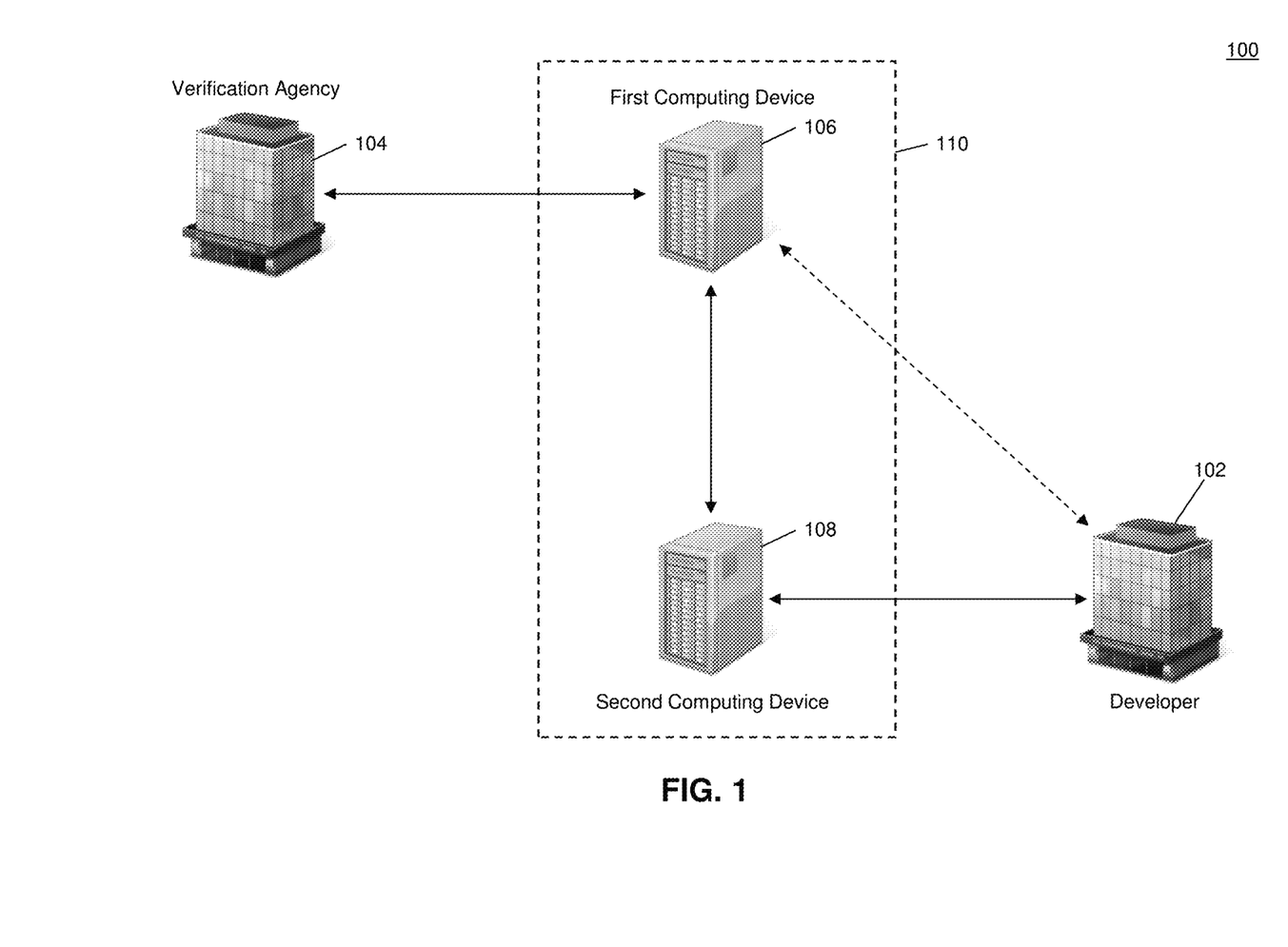
FIG. 1 is a high level architecture illustrating a system for the testing and validation of cryptographic algorithms in accordance with exemplary embodiments.

FIG. 1 illustrates a system 100 for the testing of cryptographic algorithms and the formatting of tests and test results for efficient use by verification agencies and entity computing systems.

In the system 100, a developer 102 may develop a cryptographic algorithm or an implementation of a cryptographic algorithm, both of which are collectively referred to herein as a cryptographic algorithm generally. The cryptographic algorithm may be developed to comply with one or more standards. The standards to which the cryptographic algorithm are to comply may be issued by a government agency, corporation, industry group or organization, person, or other suitable entity that will be apparent to persons having skill in the relevant art. For instance, in one example the standards may be a Federal Information Processing Standards Publication issued by the United States federal government.

The system 100 may include a verification agency 104, which may be configured to verify the compliance of the cryptographic algorithm from the developer 102 with the appropriate standard or standards. The verification agency 104 may be the entity responsible for issuing the standards, or may be another entity authorized to perform verification, validation, or otherwise assess compliance with the standards. For instance, in the above example, the verification agency 104 may be a Cryptographic Module Testing laboratory that is accredited via the National Voluntary Laboratory Accreditation Program.

The verification agency 104 may produce a plurality of tests that are used to validate the developer's 102 cryptographic algorithm. The tests may be included in a plurality of request files generated and distributed by the verification agency 104. In exemplary embodiments, the request files and/or tests may be in a format that is not suitable for execution by the developer 102 using the cryptographic algorithm to be tested.

In order to properly execute the tests, the request files may be first sent to a first computing device 106. The first computing device 106, discussed in more detail below, may be a computing device separate from systems of both the verification agency 104 and the developer 102 and may be configured to format the tests included in the request files using one or more algorithm formatting rules such that the tests can be executed using the cryptographic algorithm. The formatting of the tests may include the formatting or parsing of test parameters, renaming of files, updating of naming conventions, updating of locations, decomposition of tests, and other suitable functions.

The first computing device 106 may then transmit the request files included the formatted tests to a second computing device 108. The second computing device 108 may be configured to execute the tests using the cryptographic algorithm of the developer 102 whose compliance is being tested. In some embodiments, the second computing device 108 may be a part of the system of the developer 102. In such an embodiment, the first computing device 106 may transmit the request files with formatted tests directly to the developer 102 for execution. In other embodiments, the second computing device 108 may be part of a network separate from the developer 102, such as a network 110 that also includes the first computing device 106. In such an embodiment, the second computing device 108 may be specially configured to execute the developer's 102 cryptographic algorithm. In another embodiment, the second computing device 108 may be configured to establish a remote connection with the system of the developer 102 for execution of the tests using the cryptographic algorithm on the developer's 102 system remotely.

In another embodiment, the first computing device 106 may be configured to execute the tests. In such an embodiment, the first computing device 106 may be configured to execute the cryptographic algorithm of the developer 102 on the first computing device 106, or may be configured to establish a remote connection with a computing device of the developer 102 for execution of the tests using the cryptographic algorithm on the developer's 102 system remotely.

In yet another embodiment, the network 110 may include a plurality of additional computing devices in addition to the first computing device 106. In such an embodiment, the first computing device 106 may transmit the request files and/or tests to each of the plurality of additional computing devices. For example, if the request files include 100 different tests, the first computing device 106 may transmit 25 tests to each of four additional computing devices for execution.

The execution of the tests using the cryptographic algorithm may result in the generation of a test result for each of the executed tests. The test result may be the product of the execution of the cryptographic algorithm to the respective corresponding test, or other cryptographic manipulation. The generated tests results may be transmitted to the first computing device 106. The first computing device 106 may be configured to format each of the test results based on one or more result formatting rules. The result formatting rules may be such that the verification agency 104 can verify compliance with the appropriate standards by the cryptographic algorithm of the developer 102. The formatting of the test results may include the formatting or parsing of result or test parameters, renaming of files, updating of naming conventions, updating of locations, recomposition of tests, and other suitable functions.

The first computing device 106 may then generate response files that correspond to the request files, with each response file including the formatted test results that correspond to the tests included in the corresponding request files. The response files may then be transmitted to the verification agency 104. The verification agency may review the test results included in the response files to analyze the compliance of the cryptographic algorithm of the developer 102 with the appropriate standards.

In some embodiments, the first computing device 106 may also be configured to analyze the test results prior to providing the results to the verification agency 104. In such an embodiment, the first computing device 106 may generate expected test results for each of the tests using an internal implementation of the cryptographic algorithm to determine what the test result is expected to be, or is known to be. The first computing device 106 may then compare test results as they are received with the expected or known test results. If test results are apparently incorrect, then the first computing device 106 can inform the second computing device 108 and/or developer 102 of the results, so that appropriate action can be taken based on the results obtained.

In some instances, one test may be dependent on the results of another test. In such an instance, the first computing device 106 may check the test result for the latter test, but not for the former. If the test result is correct, then the test that is relied upon may also be determined to be correct by extension. If the test result is not correct, the first computing device 106 may then check the relied upon test to determine its correctness. In instances where a large number of tests may each be dependent on a prior result, particularly in a chain of dependencies, such a process for checking the test results may greatly decrease the processing time of the tests while maintaining a high degree of success.

In embodiments where tests results may be dependent on results of another test, the first computing device 106 may also be configured to generate the expected test results for the relied upon tests, and provide the expected test results to the second computing device 108 or other additional computing device along with the test. In such an embodiment, the computing devices may be configured to generate test results for the test without waiting on the underlying test to be executed. For example, if there are 100 tests where a significant number of tests include a complicated chain of dependency, the use of expected test results may greatly decrease the processing time by enabling the first computing device 106 to separate the tests among a plurality of additional computing devices. For instance, the 100 tests may be transmitted to 10 different computing devices for execution, even if every one of the 100 tests relied upon the result of the test prior, which may result in significantly faster processing than in traditional testing systems.

In such embodiments, as portions of the test results are returned to the first computing device 106, the first computing device 106 may compare the results to the expected test results that were used. If all expected test results match the actual test results, then the subsequently generated test results may be relied upon as correct. If any portions of the results do not match, then the portions that do not match can be examined for potential problems. Where such problems indicate unsuccessful execution by a computing device, the tests can be submitted to another computing device that is able to execute the test. Where such problems indicate incorrect implementation of the cryptographic algorithm, the failures can be recorded and reported. For instance, in the above example where each of the 100 tests relies upon the result of the previous test, the tests may be performed on multiple devices using expected results, but the result of the $46^{th}$ may be determined to be different than the expected result. The first computing device 106 may then examine the different result to determine whether the device failed to execute the test and return an answer, or whether the device returned an incorrect answer. If the device failed to return an answer, the first computing device 106 could send the $46^{th}$ test alone to another computing device for correct completion. The first computing device 106 could further determine that tests 1 through 45 and tests 47 through 100 were correctly executed on the first attempt. Thus, the tests could be completed using 10 devices with 10 encryption rounds on each, followed by one encryption round on one device. This compares to the minimum of 100 sequential rounds in traditional systems, which would take approximately 10 times as long on the first attempt, and would be a failure. In traditional systems, all 100 tests would then need to be rerun, which would take approximately 100 times as long as rerunning the one failed test. As a result, the overall efficiency of the testing is greatly increased.

The methods and systems discussed herein may enable the first computing device 106 to greatly increase the efficiency and effectiveness of cryptographic algorithm testing over traditional systems. By formatting tests included in request files to be suitable for execution by developer 102 systems, developers 102 may no longer be required to build additional interfaces to their cryptographic algorithm or systems to properly execute the tests provided by the verification agency 104. This may, in turn, result in cryptographic algorithm testing for the developer 102 at a significantly higher rate of efficiency and for significantly less resources, both in man hours, computing processing and storage. Similarly, formatting the test results into response files suitable for review by the verification agency 104 may also improve efficiency and decrease costs, in terms of monetarily expense and computer resources, for both the verification agency 104 and the developer 102.

In addition, additional features of the first computing device 106 discussed herein may further increase the advantages of the systems and methods discussed herein over traditional methods for cryptographic algorithm testing. For example, the use of expected test results for analyzing results prior to reformatting and verification by the verification agency 104 may greatly speed up the verification process, and may also result in a higher rate of success for the developer 102. Similarly, the use of a plurality of computing devices for executing the tests, and the use of expected test results may allow developers to test certain types of devices that otherwise would be impossible to test for reasons of limited processing power, speed of the devices, storage capability, or mean time before failure of the devices. For example, a test that requires ten million sequential cryptographic operations be performed on a device cannot be successfully performed on a device that has a mean time before failure corresponding to one hundred thousand cryptographic operations.

First Computing Device

Figure 2:
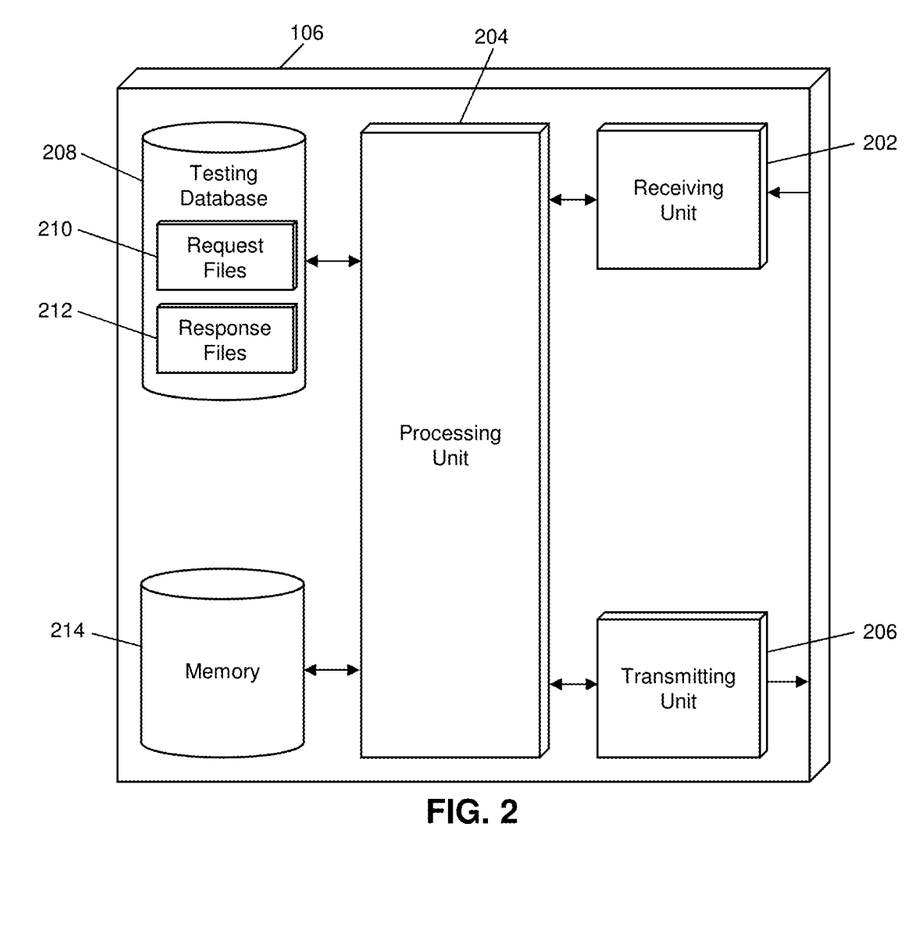
FIG. 2 is a block diagram illustrating the first computing device of FIG. 1 for providing formatting and standardization in the testing of cryptographic algorithms in accordance with exemplary embodiments.

FIG. 2 illustrates an embodiment of the first computing device 106. It will be apparent to persons having skill in the relevant art that the components of the first computing device 106 illustrated in FIG. 2 and discussed herein are used for illustration only, and that the computing device 106 may include any additional and/or alternative components suitable for performing the functions disclosed herein.

The first computing device 106 may include a receiving unit 202. The receiving unit 202 may be configured to receive data over one or more networks via one or more network protocols. In some instances, the receiving unit 202 may be configured to receive data from two or more networks using different protocols. For example, the receiving unit 202 may receive request files from the verification agency 104 via the Internet, and may transmit the formatted tests to the second computing device 108 via a local area network. The receiving unit 202 may be configured to receive request files, tests, test results, program code, formatting rules, comparison results, and other data suitable for performing the functions disclosed herein that will be apparent to persons having skill in the relevant art The first computing device 106 may also include a transmitting unit 206. The transmitting unit 206 may be configured to transmit data over one or more networks via one or more network protocols. The transmitting unit 206 may transmit request files, tests, test results, response files, program code, likelihoods of success, comparison results, formatting rules, and other data suitable for performing the functions disclosed herein that will be apparent to persons having skill in the relevant art. In some instances, the transmitting unit 206 may communicate with the same networks and using the same protocols as the receiving unit 202.

Networks communicated with via the receiving unit 202 and transmitting unit 206 may include any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The receiving unit 202 and transmitting unit 206 may also utilize one or more communication or network interfaces, such as a modem, network interface (e.g., an Ethernet card), communications port, PCMCIA slot and card, etc.

The first computing device 106 may also include a processing unit 204. The processing unit 204 may be configured to perform the functions of the first computing device disclosed herein as will be apparent to persons having skill in the relevant art. The processing unit 204 may be a single processor, a plurality of processors, or combinations thereof and may include one or more processor "cores." The processing unit 204 may also be a special purpose or a general purpose processor device.

The processing unit 204 may store request files received by the receiving unit 202 in a testing database 208 as request files 210. Each request file 210 may include a plurality of tests and may be associated with a cryptographic algorithm. The processing unit 204 may be configured to format the plurality of tests included in each request file 210 based on one or more algorithm formatting rules. The algorithm formatting rules may be received by the receiving unit 202 or may be generated by the processing unit 204, such as based on instructions received from a user, based on programming code, etc. In some instances, the formatted tests may be stored in the appropriate request file 210 in the testing database 208.

The processing unit 204 may cause the transmitting unit 206 to transmit the request files 210 and/or the formatted tests to the second computing device 108, developer 102, or other suitable entity. The receiving unit 202 may subsequently receive a plurality of tests results for each of the request files 210. In some embodiments, the test results may be generated by the processing unit 204 by execution of each corresponding test using the cryptographic algorithm associated with the respective request file 210.

Once test results have been received and/or generated, the processing unit 204 may format the test results based on one or more result formatting rules. The result formatting rules may be received by the receiving unit 202 (e.g., from the verification agency 104), or may be generated by the processing unit 204, such as based on instructions received from a user, based on programming code, etc. The processing unit 204 may be configured to generate a plurality of response files, which the processing unit 204 may store in the testing database 208 as response files 212. Each response file 212 may correspond to a request file 210 and may include the test results corresponding to each test included in the corresponding request file 210. The test results included in the response file 212 may be the formatted test results, which may be formatted in a manner suitable to the verification agency 104. The processing unit 104 may then cause the transmitting unit 206 to transmit the response files 212 to the verification agency 104.

The first computing device 104 may further include a memory 214. The memory 214 may be configured to store data suitable for performing the functions disclosed herein. For example, the memory 214 may be configured to store formatting rules, program code for execution by the processing unit 204 for performing the functions disclosed herein, algorithms for the implementation of cryptographic algorithms, algorithms for the generating of test results, and other data that will be apparent to persons having skill in the relevant art. The memory 214 may be a hard disk drive, floppy disk drive, magnetic tape drive, optical disk drive, flash memory, or any type of suitable computer readable media. Data stored in the memory 214 may be configured in any type of suitable database configuration, such as a relational database, a structured query language (SQL) database, a distributed database, an object database, etc. Suitable configurations and storage types will be apparent to persons having skill in the relevant art.

In some embodiments, the processing unit 204 may be further configured to generate expected test results. In such an embodiment, the processing unit 204 may generate a test result for each test included in a request file 210 using an internal implementation of the cryptographic algorithm associated with the corresponding request file 210. The processing unit 204 may also be configured to compare the expected test results with actual test results received by the receiving unit 202. In such an instance, the processing unit 204 may be configured (e.g., based on rules and/or program code stored in the memory 214) to perform one or more functions based on the comparison. For instance, in one embodiment, the comparison may result in the determination of a likelihood of success of the respective test result. If the likelihood of success is below a predetermined value, the processing unit 204 may cause the transmitting unit 206 to transmit an instruction to a corresponding additional computing device (e.g., the second computing device 108) to repeat the test. In some instances, the processing unit 204 may identify one or more recommendations for the additional computing device prior to repeating the test.

In some embodiments, the processing unit 204 may be configured to cause the transmitting unit 206 to transmit expected test results along with tests to additional computing devices for use in execution of the tests. For example, in instances where a test may be reliant upon the result of another test, the transmitting unit 204 may transmit the expected test result, generated by the processing unit 204, for the other test to be used in execution of the primary test. In one embodiment, the processing unit 204 may be configured to compare test results received for tests whose results are used in dependency with the expected test results. In such an embodiment, the processing unit 204 may cause computing devices to repeat tests with actual test results if the expected test results used in such tests were different from the actual test results as a result of an inability to execute the test.

In some instances, the processing unit 204 may also be configured to separate tests and/or request files 210 for transmission to a plurality of additional computing devices. In such an instance, the processing unit 204 may separate the tests and/or request files 210 using any suitable criteria, such as based on test dependency, total number of tests and/or request files, computing power of the additional computing devices, etc. For example, in one instance, the processing unit 204 may transmit an equal number of tests to each of a plurality of computing devices.

Process for Testing Cryptographic Algorithms

Figure 3:
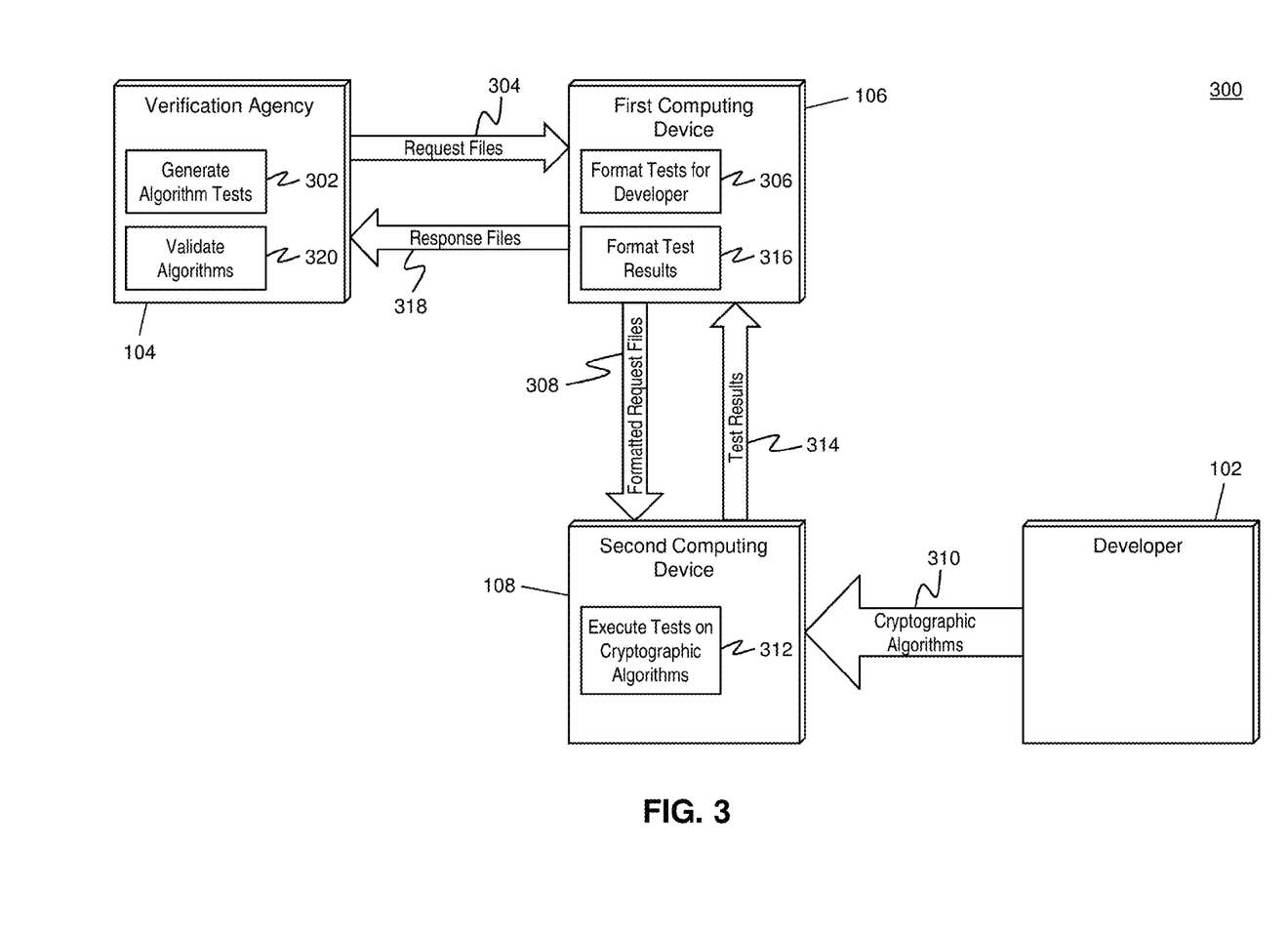
FIG. 3 is a flow diagram illustrating a process for testing cryptographic algorithms using the system of FIG. 1 in accordance with exemplary embodiments.

FIG. 3 illustrates a process 300 for the testing of cryptographic algorithms using the system 100 of FIG. 1 including the first computing device 106 of FIG. 2 for formatting tests and response files for inclusion in systems of the developer 102 and verification agency 104.

In step 302, the verification agency 104 may generate algorithm test inputs (tests). The tests may be constructed so as to partially verify a cryptographic algorithm's compliance with one or more standards. The tests may be included in one or more request files, with each request file being associated with one or more cryptographic algorithms. In step 304, the verification agency 104 may transmit the request files to the first computing device 106, to be received by the receiving unit 202 of the first computing device 106.

In step 306, the processing unit 204 of the first computing device 106 may format the tests included in each of the request files for execution by systems of the developer 102 based on one or more formatting rules, which may be stored in the memory 214 of the first computing device 106. In step 308, the transmitting unit 206 of the first computing device 106 may transmit the request files that include the formatted tests to the second computing device 108. A receiving unit of the second computing device 108 may receive the request files and the included formatted tests. In some embodiments, step 308 may also include the transmitting of expected test results for one or more tests, such as for use in the execution of other tests that rely on the test results.

In step 310, the developer 102 may transmit the cryptographic algorithms to be tested, and any additional data associated thereof, such as program code suitable for the execution of the cryptographic algorithms and/or software programs associated thereof, to the second computing device 108. It will be apparent to persons having skill in the relevant art that step 310 may be performed prior to the receipt of the request files by the second computing device 108. It will also be apparent to persons having skill in the relevant art that, in embodiments where the second computing device 108 is configured to connect to the developer 102 system remotely, step 310 may be replaced by the connection of the second computing device 108 to the developer 102 system.

In step 312, a processor or processing unit of the second computing device 108 may execute the formatted tests included in the received request files using the cryptographic algorithms provided by the developer 102. The execution of the tests may generate, for each of the executed tests, a test result. In some embodiments, one or more of the tests may be executed using expected test results, which may have been received by the second computing device 108 in step 308. In other embodiments, the second computing device 108 may sequentially execute tests in instances where one test relies upon the test result of another test.

Once the test results have been generated, then, in step 314, the second computing device 108 may transmit the test results to the first computing device 106, to be received by the receiving unit 202 of the first computing device 106. In step 316, the processing unit 204 of the first computing device 106 may format the test results using one or more result formatting algorithms stored in the memory 214. The processing unit 204 may also generate a plurality of response files, with each response file corresponding to a received request file and including the formatted test results that correspond to each test included in the corresponding request file.

In step 318, the transmitting unit 206 of the first computing device 106 may transmit the response files that included the properly formatted test results to the verification agency 104. In step 320, the verification agency 104 may validate the cryptographic algorithm's compliance with the appropriate standards based on the results of the execution of the tests using the cryptographic algorithm.

Figure 4:
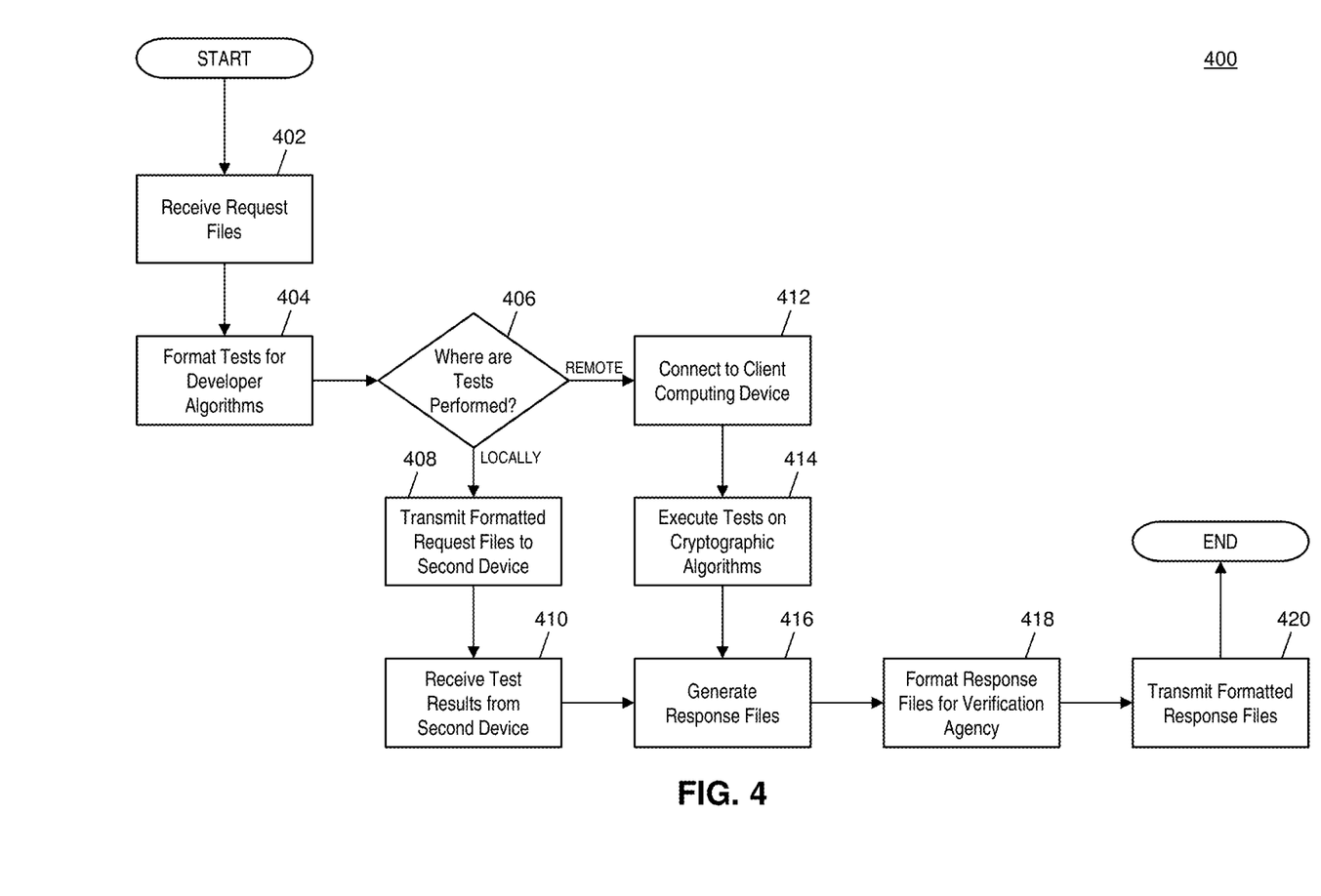
FIG. 4 is a flow diagram illustrating a process for formatting tests and test response files for cryptographic algorithm testing using the computing device of FIG. 2 in accordance with exemplary embodiments.

Processing for Formatting Tests and Response Files for Cryptographic Algorithm Testing FIG. 4 illustrates a process 400 for the formatting of tests and response files for use in the testing and validation of a cryptographic algorithm by the first computing device 106.

In step 402, the receiving unit 202 of the first computing device 106 may receive one or more request files from the verification agency 104. Each of the request files may be associated with a cryptographic algorithm being tested and may include a plurality of tests. In step 404, the processing unit 204 of the first computing device 106 may format each of the plurality of tests included in the received one or more request files for execution using the cryptographic algorithms of the developer 102 being tested. Each of the tests may be formatted based on one or more algorithm formatting rules, which may be stored in the memory 214 of the first computing device 106.

In step 406, the processing unit 204 may determine, such as based on rules stored in the memory 214, where the tests are to be performed. If the tests are to be performed locally in the network 110, then, in step 408, the request files including the formatted tests may be transmitted to a second computing device 108 configured to execute the developer's 102 cryptographic algorithms. In step 410, the receiving unit 202 of the first computing device 106 may receive test results for each of the formatted tests from the second computing device 108. The test results may be results generated from the execution of each of the tests using the cryptographic algorithm associated with the respective request file.

If, in step 406, the processing unit 204 determines that the tests are to be performed by the systems of the developer 102 and accessed remotely, then, in step 412, the first computing device 106 may connect remotely to a computing device of the developer 102. In some embodiments, the remote connection may be established by the second computing device 108 in the network 110 with the first computing device 106. In step 414, the tests may be executed on the computing device of the developer 102 using the cryptographic algorithm associated with the respective request file from which the appropriate test is included. Execution of each of the tests may generate a corresponding test result.

In step 416, the processing unit 204 of the first computing device 106 may generate a plurality of response files. Each response file may include a plurality of test results and may correspond to a received request file. The plurality of test results included in each response file may correspond to the tests included in the corresponding request file. In step 418, the processing unit 204 may format the response files in a format suitable for use by the verification agency 104, such as based on one or more result formatting rules, which may be stored in the memory 214 of the first computing device 106. In step 420, the transmitting unit 206 of the first computing device 106 may transmit the formatted response files to the verification agency 104.

Process for Comparison of Test Results

Figure 5:
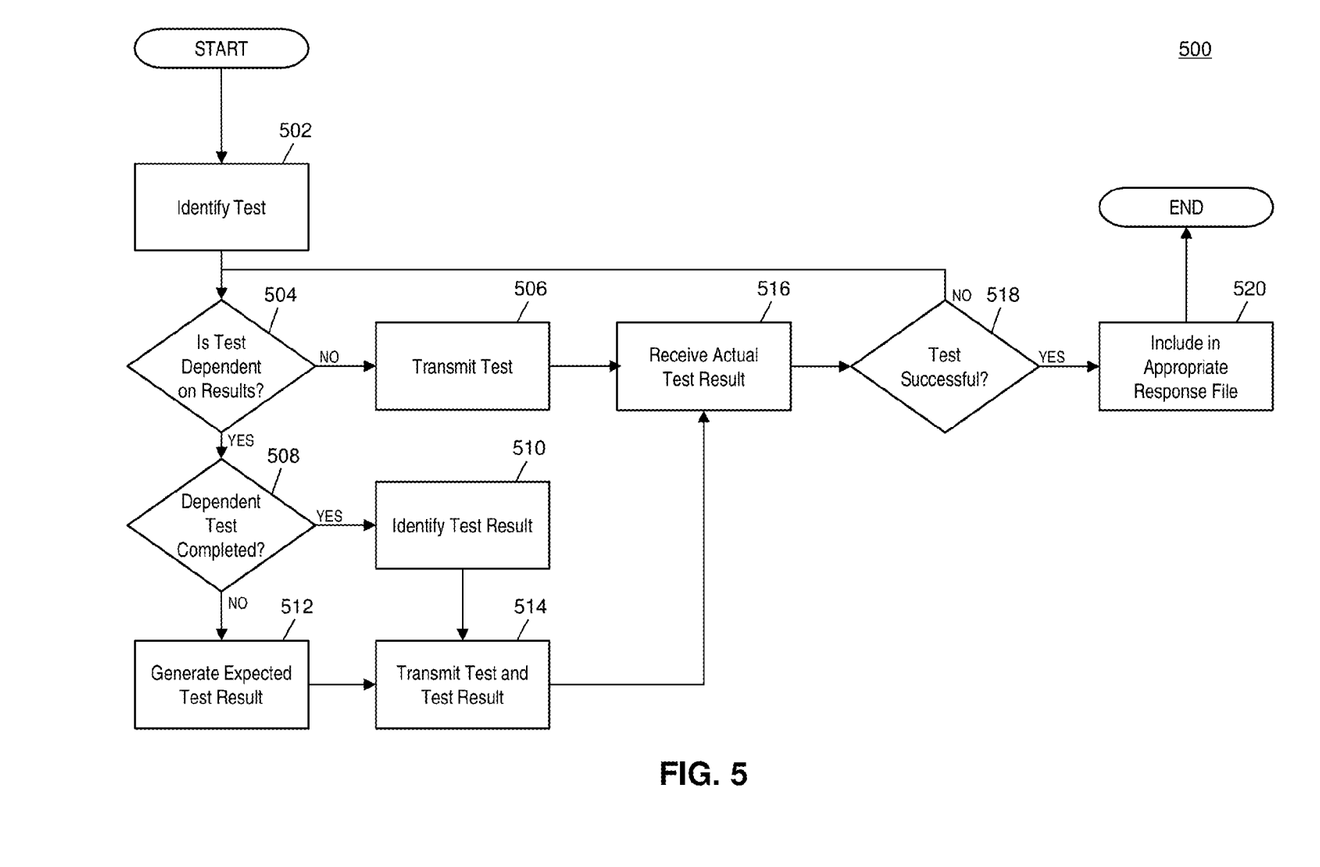
FIG. 5 is a flow diagram illustrating the processing and evaluation of tests for cryptographic algorithm testing using the computing device of FIG. 2 in accordance with exemplary embodiments.

FIG. 5 illustrates a process 500 for the comparison of test results with expected test results and uses thereof in the generating of test results that rely on the execution of prior tests.

In step 502, the processing unit 204 of the first computing device 106 may identify a test to be executed to test for compliance of a cryptographic algorithm with one or more standards. The test may be formatted (e.g., by the processing unit 204, as discussed above) to be executed using the cryptographic algorithm and/or for execution using the systems of a developer 102. In step 504, the processing unit 204 may determine if the identified test is dependent on the results of a different test. If not, then, in step 506, the test may be transmitted (e.g., along with other tests) to an additional computing device, such as the second computing device 108, for execution.

If the test is dependent on the results of a different test, then, in step 508, the processing unit 204 may determine if the dependent test, on whose results the identified test relies, has already been completed and its corresponding test result obtained. If the test has been completed, then, in step 510, the processing unit 204 may identify the corresponding test result. If the test has not been completed, then, in step 512, the processing unit 204 may generate an expected test result by executing the dependent test using an internal implementation of the cryptographic algorithm. Once a test result, actual or expected, has been identified, then, in step 514, the test, (which may be constructed from a prior dependent test result) may be transmitted to a computing device for execution.

In step 516, the receiving unit 202 of the first computing device 106 may receive the actual test result for the identified test. In step 518, the processing unit 204 may determine if the test was successful based on the actual test result. In some embodiments, the determination may be based on comparison of the actual test result to an expected test result, such as generated by the processing unit 204 or received from the verification agency 104. In other embodiments, the determination may be based on data received from the verification agency 104, such as in response to providing the test result to the verification agency 104.

If the test is not successful, then the process 500 may return to step 504 where the test is repeated, such as by using updated information (e.g., a dependent test result) or by changing of the cryptographic algorithm, associated programming, or computing device. In some embodiments, the processing unit 204 of the first computing device 106 may generate a report regarding the unsuccessful test, such as for review by the developer 102. If the test is successful, then, in step 520, the processing unit 204 may include the test result in the appropriate response file, for later formatting for transmission to the verification agency 104, as discussed above.

Exemplary Method for Testing Cryptographic Algorithms

Figure 6:
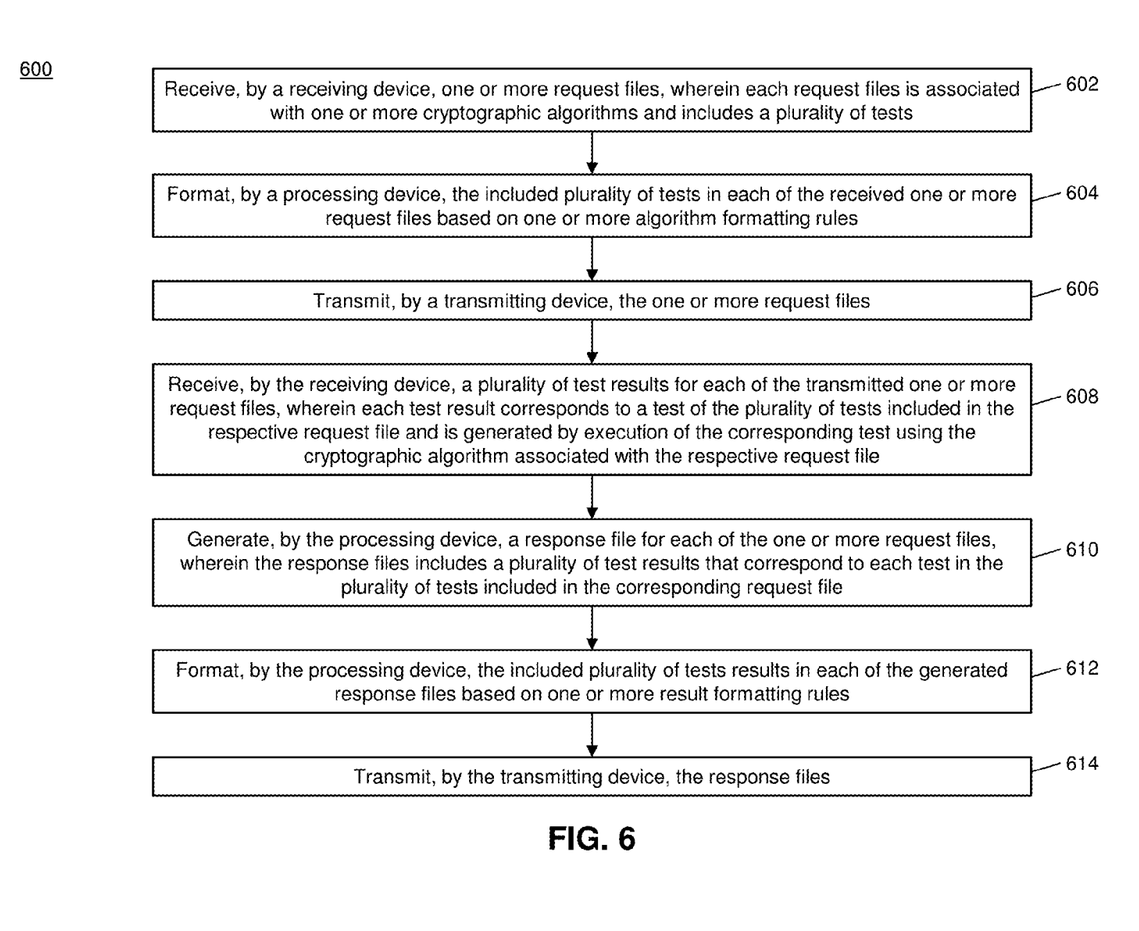
FIG. 6 is a flow chart illustrating an exemplary method for testing cryptographic algorithms in accordance with exemplary embodiments.

FIG. 6 illustrates a method 600 for the testing of cryptographic algorithms via the formatting of tests in request files and the formatting of test results for use in validation of the cryptographic algorithms.

In step 602, one or more request files may be received by a receiving device (e.g., the receiving unit 202), wherein each request file is associated with one or more cryptographic algorithms and includes a plurality of tests. In step 604, the plurality of tests included in each of the received one or more request files may be formatted by a processing device (e.g., the processing unit 204) based on one or more algorithm formatting rules. In step 606, the one or more request files may be transmitted by a transmitting device (e.g., the transmitting unit 206).

In step 608, a plurality of tests results may be received by the receiving device 202 for each of the transmitted one or more request files, wherein each test result corresponds to a test of the plurality of tests included in the respective request file and is generated by execution of the corresponding test using the cryptographic algorithm associated with the respective request file. In step 610, a response file may be generated by the processing device 204 for each of the one or more request files, wherein the response files include a plurality of test results that correspond to various tests or portions of tests in the plurality of tests included in the corresponding request file.

In step 612, the included plurality of test results in each of the generated response files may be formatted by the processing device 204 based on one or more result formatting rules. In one embodiment, the one or more result formatting rules may be based on one or more specifications of a validation or certification body, such as the Cryptographic Algorithm Validation Program. In step 614, the response files may be transmitted by the transmitting device 206.

In one embodiment, the processing device 204, receiving device 202, and transmitting device 206 may be included in a first computing device (e.g., the first computing device 106), and the one or more request files may be transmitted to a second computing device (e.g., the second computing device 108). In a further embodiment, the second computing device 108 may include a second processing device configured to execute each test of the plurality of tests included in each of the one or more request files using the associated cryptographic algorithm to generate the corresponding test result. In an even further embodiment, the second computing device 108 may include a second transmitting device configured to transmit the plurality of test results to the receiving device 202 of the first computing device 106. In another further embodiment, the first computing device 106 and the second computing device 108 may communicate via a socket. In an even further embodiment, the transmitting device 206 may be configured to transmit each test included in each of the one or more request files through the socket one at a time.

In some embodiments, the method 600 may further include executing, by the processing device 204, each test of the plurality of tests included in each of the one or more request files using the associated cryptographic algorithm to generate the corresponding test result, wherein the receiving device 202 receives the plurality of test results from the processing device 204. In one embodiment, the processing device 204, receiving device 202, and transmitting device 206 are included in a first computing device 106, and transmitting the request files may include transmitting each test of the plurality of tests included in the one or more request files to one of a plurality of additional computing devices. In a further embodiment, at least one test of the plurality of tests may be dependent on a test result corresponding to another test of the plurality of tests. In an even further embodiment, the method 600 may also include generating, by the processing device 204, an expected test result for the another test, wherein the expected test result is generated by an internal implementation of the cryptographic algorithm associated with the request file that includes the another test, and wherein the at least one test of the plurality of tests and the another test of the plurality of tests are transmitted to different computing devices.

In some embodiments, the method 600 may further include: generating, by the processing device 204, a plurality of expected test results for each of the received one or more request files, wherein each expected test result corresponds to various tests or portions of the plurality of tests included in the respective request file and is generated by an internal implementation of the cryptographic algorithm associated with the respective request file; and determining, for each test result of the received plurality of test results, a likelihood of success based on a comparison of the respective test result and a corresponding expected test result of the plurality of test results that corresponds to a same test of the plurality of tests. In a further embodiment, the method 600 may even further include: transmitting, by the transmitting device 206, one or more request files for reprocessing that include a test for which the determined likelihood of success for the corresponding test result is below a predetermined value; and receiving, by the receiving device 202, one or more updated test results, wherein each of the one or more updated test results corresponds to a test result of the plurality of test results for which the determined likelihood of success is below the predetermined value, wherein the generated response file for each of the one or more request files for reprocessing includes the received one or more updated test results in place of the corresponding test result for which the determined likelihood of success is below the predetermined value.

Techniques consistent with the present disclosure provide, among other features, systems and methods for testing cryptographic algorithms. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for testing cryptographic algorithms, comprising:
   receiving, by a receiving device, one or more request files, wherein each request files is associated with one or more cryptographic algorithms and includes a plurality of tests;
   formatting, by a processing device, the included plurality of tests in each of the one or more request files received from the receiving device based on one or more algorithm formatting rules;
   transmitting, by a transmitting device, the one or more request files formatted by the processing device;
   receiving, by the receiving device, a plurality of test results for each of the one or more request files transmitted by the transmitting device, wherein each test result corresponds to a test of the plurality of tests included in the respective request file and is generated by execution of the corresponding test using the cryptographic algorithm associated with the respective request file;
   generating, by the processing device, a response file for each of the one or more request files received from the receiving device, wherein the response files includes a plurality of test results received by the receiving device that correspond to various tests or portions of tests in the plurality of tests included in the corresponding request file;
   formatting, by the processing device, the included plurality of tests results in each of the generated response files based on one or more result formatting rules; and
   transmitting, by the transmitting device, the response files generated by the processing device.

2. The method of claim 1, wherein
   the processing device, receiving device, and transmitting device are included in a first computing device, and
   the one or more request files are transmitted to a second computing device.

3. The method of claim 2, wherein the second computing device includes a second processing device configured to execute each test of the plurality of tests included in each of the one or more request files using the associated cryptographic algorithm to generate the corresponding test result.

4. The method of claim 3, wherein the second computing device includes a second transmitting device configured to transmit the plurality of test results to the receiving device of the first computing device.

5. The method of claim 2, wherein the first computing device and the second computing device communicate via a socket.

6. The method of claim 5, wherein the transmitting device is configured to transmit each test included in each of the one or more request files through the socket one at a time.

7. The method of claim 1, further comprising:
   executing, by the processing device, each test of the plurality of tests included in each of the one or more request files using the associated cryptographic algorithm to generate the corresponding test result,
   wherein the receiving device receives the plurality of test results from the processing device.

8. The method of claim 1, wherein the one or more result formatting rules are based on one or more specifications of a validation or certification body.

9. The method of claim 1, further comprising:
   generating, by the processing device, a plurality of expected test results for each of the received one or more request files, wherein each expected test results corresponds to various tests or portions of tests of the plurality of tests included in the respective request file and is generated by an internal implementation of the cryptographic algorithm associated with the respective request file; and
   determining, for each test result of the received plurality of test results, a likelihood of success based on a comparison of the respective test result and a corresponding expected test result of the plurality of test results that corresponds to a same test of the plurality of tests.

10. The method of claim 9, further comprising:
    transmitting, by the transmitting device, one or more request files for reprocessing that include a test for which the determined likelihood of success for the corresponding test result is below a predetermined value; and
    receiving, by the receiving device, one or more updated test results, wherein each of the one or more updated test results corresponds to a test result of the plurality of test results for which the determined likelihood of success is below the predetermined value, wherein
    the generated response file for each of the one or more request files for reprocessing includes the received one or more updated test results in place of the corresponding test result for which the determined likelihood of success is below the predetermined value.

11. The method of claim 1, wherein
    the processing device, receiving device, and transmitting device are included in a first computing device, and
    transmitting the one or more request files includes transmitting each test of the plurality of tests included in the one or more request files to one of a plurality of additional computing devices.

12. The method of claim 11, wherein at least one test of the plurality of tests is dependent on a test result corresponding to another test of the plurality of tests.

13. The method of claim 12, further comprising:
generating, by the processing device, an expected test result for the another test of the plurality of tests, wherein the expected test result is generated by an internal implementation of the cryptographic algorithm associated with the request file that includes the another test, wherein
the at least one test of the plurality of tests and the another test of the plurality of tests are transmitted to different computing devices of the plurality of additional computing devices.

14. A system for testing cryptographic algorithms, comprising:
a receiving device configured to receive one or more request files, wherein each request file is associated with one or more cryptographic algorithms and includes a plurality of tests;
a processing device configured to format the included plurality of tests in each of the one or more request files received by the receiving device based on one or more algorithm formatting rules; and
a transmitting device configured to transmit the one or more request files formatted by processing device, wherein
the receiving device is further configured to receive a plurality of test results for each of the one or more request files transmitted by the transmitting device, wherein each test result corresponds to a test of the plurality of tests included in the respective request file and is generated by execution of the corresponding test using the cryptographic algorithm associated with the respective request file,
the processing device is further configured to:
generate a response file for each of the one or more request files received by the receiving device, wherein the response files includes a plurality of test results received by the receiving device that correspond to various tests or portions of tests in the plurality of tests included in the corresponding request file, and
format the included plurality of tests results in each of the generated response files based on one or ore result formatting rules, and
the transmitting device is further configured to transmit the response files generated by the processing device.

15. The system of claim 14, wherein
the processing device, receiving device, and transmitting device are included in a first computing device, and
the one or more request files are transmitted to a second computing device.

16. The system of claim 15, wherein the second computing device includes a second processing device configured to execute each test of the plurality of tests included in each of the one or more request files using the associated cryptographic algorithm to generate the corresponding test result.

17. The system of claim 16, wherein the second computing device includes a second transmitting device configured to transmit the plurality of test results to the receiving device of the first computing device.

18. The system of claim 15, wherein the first computing device and the second computing device communicate via a socket.

19. The system of claim 18, wherein the transmitting device is configured to transmit each test included in each of the one or more request files through the socket one at a time.

20. The system of claim 14, wherein
the processing device is further configured to execute each test of the plurality of tests included in each of the one or more request files using the associated cryptographic algorithm to generate the corresponding test result,
wherein the receiving device receives the plurality of test results from the processing device.

21. The system of claim 14, wherein the one or more result formatting rules are based on one or more specifications of a validation or certification body.

22. The system of claim 14, wherein
the processing device is further configured to
generate a plurality of expected test results for each of the received one or more request files, wherein each expected test result corresponds to various tests or portions of tests included in the respective request file and is generated by an internal implementation of the cryptographic algorithm associated with the respective request file, and
determine, for each test result of the received plurality of test results, a likelihood of success based on a comparison of the respective test result and a corresponding expected test result of the plurality of test results that corresponds to a same test of the plurality of tests.

23. The system of claim 22, wherein
the transmitting device is further configured to transmit one or more request files for reprocessing that include a test for which the determined likelihood of success for the corresponding test result is below a predetermined value,
the receiving device is further configured to receive one or more updated test results, wherein each of the one or more updated test results corresponds to a test result of the plurality of test results for which the determined likelihood of success is below the predetermined value, and
the generated response file for each of the one or more request files for reprocessing includes the received one or more updated test results in place of the corresponding test result for which the determined likelihood of success is below the predetermined value.

24. The system of claim 14, wherein
the processing device, receiving device, and transmitting device are included in a first computing device, and
transmitting the one or more request files includes transmitting each test of the plurality of tests included in the one or more request files to one of a plurality of additional computing devices.

25. The system of claim 24, wherein at least one test of the plurality of tests is dependent on a test result corresponding to another test of the plurality of tests.

26. The system of claim 25, wherein
the processing device is further configured to generate an expected test result for the another test of the plurality of tests, wherein the expected test result is generated by an internal implementation of the cryptographic algorithm associated with the request file that includes the another test, and
the at least one test of the plurality of tests and the another test of the plurality of tests are transmitted to different computing devices of the plurality of additional computing devices.

27. A non-transitory computer readable recording medium configured to store a program causing a processing device of a computing device to execute a method for testing cryptographic algorithms, the method comprising:

receiving, by a receiving device, one or more request files, wherein each request files is associated with one or more cryptographic algorithms and includes a plurality of tests;

formatting, by the processing device, the included plurality of tests in each of the one or more request files received by the receiving device based on one or more algorithm formatting rules;

transmitting, by a transmitting device, the one or more request files formatted by the processing device;

receiving, by the receiving device, a plurality of test results for each of the one or more request files transmitted by the transmitting device, wherein each test result corresponds to various tests or portions of tests of the plurality of tests included in the respective request file and is generated by execution of the corresponding test using the cryptographic algorithm associated with the respective request file;

generating, by the processing device, a response file for each of the one or more request files received by the receiving device, wherein the response files includes a plurality of test results received by the receiving device that correspond to various tests or portions of tests in the plurality of tests included in the corresponding request file;

formatting, by the processing device, the included plurality of tests results in each of the generated response files based on one or more result formatting rules; and transmitting, by the transmitting device, the response files generated by the processing device.

28. The non-transitory computer readable recording medium of claim 27, wherein the one or more request files are transmitted to a second computing device.

29. The non-transitory computer readable recording medium of claim 28, wherein the computing device and the second computing device communicate via a socket.

30. The non-transitory computer readable recording medium of claim 29, wherein the transmitting device is configured to transmit each test included in each of the one or ore request files through the socket one at a time.

31. The non-transitory computer readable recording medium of claim 27, wherein the method further comprises:
executing, by the processing device, each test of the plurality of tests included in each of the one or more request files using the associated cryptographic algorithm to generate the corresponding test result,
wherein the receiving device receives the plurality of results from the processing device.

32. The non-transitory computer readable recording medium of claim 27, wherein the one or more result formatting rules are based on one or more specifications of a validation or certification body.

33. The non-transitory computer readable recording medium of claim 27, wherein the method further comprises:

generating, by the processing device, a plurality of expected test results for each of the received one or more request files, wherein each expected test results corresponds to various tests or portions of tests of the plurality of tests included in the respective request file and is generated by an internal implementation of the cryptographic algorithm associated with the respective request file; and determining, for each test result of the received plurality of test results, a likelihood of success based on a comparison of the respective test result and a corresponding expected test result of the plurality of test results that corresponds to a same test of the plurality of tests.

34. The non-transitory computer readable recording medium of claim 28, wherein the method further comprises:
transmitting, by the transmitting device, one or more request files for reprocessing that include a test for which the determined likelihood of success for the corresponding test result is below a predetermined value; and
receiving, by the receiving device, one or more updated test results, wherein each of the one or more updated test results corresponds to a test result of the plurality of test results for which the determined likelihood of success is below the predetermined value, wherein
the generated response file for each of the one or more request files for reprocessing includes the received one or more updated test results in place of the corresponding test result for which the determined likelihood of success is below the predetermined value.

35. The non-transitory computer readable recording medium of claim 27, wherein transmitting the one or more request files includes transmitting each test of the plurality of tests included in the one or more request files to one of a plurality of additional computing devices.

36. The non-transitory computer readable recording medium of claim 35, wherein at least one test of the plurality of tests is dependent on a test result corresponding to another test of the plurality of tests.

37. The non-transitory computer readable recording medium of claim 36, wherein the method further comprises:
generating, by the processing device, an expected test result for the another test of the plurality of tests, wherein the expected test result is generated by an internal implementation of the cryptographic algorithm associated with the request file that includes the another test, wherein
the at least one test of the plurality of tests and the another test of the plurality of tests are transmitted to different computing devices of the plurality of additional computing devices.

* * * * *